Patented Feb. 17, 1948

2,436,080

UNITED STATES PATENT OFFICE 2,436,080

RESINOUS COMPOSITION OF UREA-ALDEHYDE AND HYDROLYZED INTERPOLYMER OF A VINYL ESTER

Albert Faris Smith, Wilmington, Del., assignor to E. I. du Pont de Nemours & Company, Wilmington, Del., a corporation of Delaware No Drawing. Application May 17, 1943, Serial No. 487,367

7 Claims. (Cl. 260—45.2)

This invention relates to new compositions of matter and more particularly to new resinous molding compositions.

Urea-formaldehyde resins have long been known in the art and have been produced commercially for many years. Unmodified urea-formaldehyde compositions are water sensitive, brittle, and have a tendency to craze, and for these reasons it is generally necessary to incorporate cellulose to obtain products of sufficient toughness and water resistance for commercial applications. In spite of the fact that cellulose-filled urea-formaldehyde resins are somewhat deficient in water resistance and toughness, they are widely used, mainly because of their low cost and availability in many brilliant, attractive colors.

This invention has as an object the manufacture of urea-formaldehyde resin compositions having improved water resistance and toughness. A further object is the production of new and improved molding compositions. Further objects reside in methods for making these compositions and for obtaining improved molded articles therefrom. Other objects will appear hereinafter.

These objects are accomplished by incorporating with urea-aldehyde resins, hydrolyzed interpolymers of vinyl organic esters with other polymerizable compounds containing a single ethylenic double bond.

I have found that resinous compositions obtained by mixing, in the manner described herein, urea-aldehyde resins and the above mentioned hydrolyzed interpolymers are easily molded into articles having outstanding toughness and water resistance. In fact, the products of my invention possess most of the virtues of cellulose-filled urea-aldehyde resins, and have the added advantage of better impact strength, water resistance, and craze resistance. I attribute the high quality of my molded articles to chemical interaction between the urea-aldehyde resin and the hydrolyzed interpolymer during the heating cycle used in molding.

The interpolymers of vinyl organic esters with other polymerizable compounds which are subsequently hydrolyzed to give the hydrolyzed interpolymers used in this invention are best prepared by copolymerizing ethylene and an organic vinyl ester, for example, vinyl acetate, at temperatures of about 100° C. or less and at ethylene pressure below 1000 atmospheres, preferably below 500 atmospheres in the presence of a peroxygen catalyst. The hydrolysis, which is intended also to refer to alcoholysis since the product obtained is the same, is preferably carried out by dissolving the interpolymer in an alcohol such as methanol or ethanol, or in a mixture of an alcohol and a hydrocarbon such as toluene, and then treating with a suitable hydrolyzing agent or catalyst such as alkali or mineral acid. The hydrolysis may be partial or complete, depending on the nature of the solvent, the amount and kind of catalyst used, and the time and temperature of reaction.

The preferred method of preparing the compositions of this invention, i. e., compositions comprising urea-aldehyde resins and the above mentioned hydrolyzed interpolymers, consists in reacting urea and formaldehyde in a solvent, for example, water, to form a viscous solution of urea-formaldehyde resin having the consistency of a sirup and mixing this resin sirup with the very finely divided hydrolysis product of an ethylene vinyl acetate interpolymer. The resultant mixture is then dried by evaporation of the solvent, pulverized, pigmented, compacted, etc., by suitable procedure. The solid composition so obtained is readily molded into the desired articles.

The urea-formaldehyde sirup can be prepared in any of the many ways known to those familiar with the art. A preferred procedure consists in heating under reflux an aqueous solution of urea and formaldehyde, using a urea to formaldehyde ratio of from 1:1.5 to 1:2 and a slightly acid medium, for a sufficient time to cause the condensation to proceed to an appreciable extent, but not to proceed beyond the soluble stage. The length of the heating period depends upon the pH of the reaction medium, the ratio of reactants, and the reflux temperature. Urea to formaldehyde ratios may range from 1:1 to 3:1 depending on the intended use of the resin, but ratios of 1:1.5 to 1:2 are generally preferred, because maximum water resistance and toughness are developed within this range.

The hydrolyzed ethylene/vinyl organic ester interpolymers, preferably interpolymers in which the mol ratio of ethylene to vinyl ester lies between 25:1 and 1:25, are very suitable for incorporating with urea-formaldehyde resins because the resultant compositions have particularly good toughness and water resistance. These hydrolyzed interpolymers can be added to the urea-formaldehyde resins in any form, for example, as powder, granules, flake, film, or solution.

Other methods can also be used for preparing the products of this invention. For instance, urea-formaldehyde resins in the solid state but which are not completely converted to the final hydrophobic stage (insoluble stage) are mechanically mixed with the hydrolyzed interpolymers by any suitable means, for example, ball milling, to give the desired resinous product. Another procedure consists in mixing (soluble) solid urea-formaldehyde resins with a solution of hydrolyzed interpolymers and then drying the resultant mixtures, comminuting, etc., to form molding powders. Another method consists in mixing urea-formaldehyde resin solutions and solutions of hydrolyzed interpolymers, drying the resultant mixtures, and processing them by conventional procedures.

An additional method for obtaining the products of this invention consists in adding the hydrolysis product of an ethylene/vinyl organic ester interpolymer either as a solid or in solution to the urea-formaldehyde reaction mixture prior to the condensation of the urea and formaldehyde. After the hydrolyzed ethylene/vinyl organic ester interpolymer, urea and formaldehyde have been reacted to the desired extent, the final composition is dried and further treated by any of the standard procedures.

Although it is usually desired to use an aqueous medium, other media can be used. These media are those which dissolve urea and formaldehyde, for example. dioxane, methanol, ethanol, dimethylformamide, etc.

In the following examples in which the invention is illustrated in greater detail the urea-formaldehyde resin solution was prepared by the following procedure: A solution of 2066 parts of 37% formaldehyde and 687 parts of urea is adjusted to a pH of 9.15 by adding 4.8 parts of 10% sodium hydroxide solution and 5 parts of disodium phosphate dodecahydrate. The solution is refluxed one hour and then cooled to 35° C. (pH=6.7). The pH is readjusted to 5.5 by adding formic acid and then 85 parts of urea is added. The solution is refluxed for 20 minutes and again cooled to 35° C. One hundred and thirty-seven parts of urea is added to give a final formaldehyde to urea ratio of 1.7:1. Twenty-nine hundred and eighty (2980) parts of resin sirup are obtained containing 1520 parts of solid. The urea-formaldehyde resin at this point is in the so-called A stage (soluble).

*Example I*

To the urea-formaldehyde resin solution prepared as described above is added 1300 parts of finely divided hydrolyzed ethylene/vinyl acetate interpolymer having an ethylene:vinyl acetate molar ratio of 10.7:1 prepared as described below. Thorough dispersion is obtained by adding a few drops of a hexylphenol-ethylene oxide condensation product ("Igepal C") and agitating very vigorously. The resultant mixture is placed in a large steel pan and dried in a vacuum oven for 18 hours at 60° C., 1.2 hours at 60°–80° C., 1.8 hours at 80° C., and finally 5.5 hours at 95°–100° C. in an ordinary oven. The product is a slightly grayish solid containing 46% hydrolyzed ethylene/vinyl acetate and 54% urea-formaldehyde resin.

The dried resin composition obtained in accordance with the foregoing example is ball milled with 0.5% of beta-bromohydrocinnamic acid (molding catalyst) and 0.7% aluminum stearate (lubricant). Molded articles obtained by compression molding at 155° C. and 2800 lbs./sq. in. for 8 minutes are superior to cellulose-filled urea-formaldehyde resins in toughness (impact strength) and water resistance. For example, these molded articles possess an average impact strength of 0.58 ft. lb./in. of notch (Charpy) as compared to published values of 0.30–0.36 for cellulose-filled urea-formaldehyde resins (pages 184 to 185, Modern Plastics Catalogue, 1942). Furthermore, when chips 2" in diameter and 1/8" thick are immersed in water, they absorb only 1.2% water as compared to 2% for cellulose-filled urea-formaldehyde resins tested under the same conditions. On outdoor exposure, molded articles of this resin show practically no change after 90 days, whereas commercial cellulose-filled urea-formaldehyde resins craze considerably under the same treatment.

The hydrolyzed interpolymer used in the above example is prepared as follows: A pressure vessel is charged to about 1/3 its capacity with 160 parts of vinyl acetate, 160 parts of oxygen-free water, 0.7 part of the sodium salt of sulfonated white oil, and 1 part of benzoyl peroxide. Oxygen-free nitrogen is admitted over this reaction mixture to exclude all atmospheric oxygen. Ethylene is admitted until the pressure in the reaction vessel is 540 atmospheres. The reaction is carried out at 73°–75° C. for 14 hours using constant agitation. Before reaction starts the pH is adjusted to 2.9. At the end of the reaction the pH is 3.7. The reaction mixture is steam distilled. This coagulates the interpolymer and removes volatile impurities. The coagulated interpolymer is washed and dried on a rubber mill. The yield is 281 parts of an interpolymer containing a mol ratio of 10.7:1 of ethylene to vinyl acetate. Two hundred and six (206) parts of this ethylene/vinyl acetate interpolymer is dissolved in 2060 parts of benzene by heating on a steam bath for approximately 12 hours. Thirty-eight and seven-tenths (38.7) parts of potassium hydroxide dissolved in 250 parts of ethyl alcohol is added to the hot benzene solution and the resultant mixture refluxed for 2 hours. A small amount of insoluble material precipitates and this is removed by filtering the hot reaction mixture through cheese cloth. The solution obtained as a filtrate is slowly cooled while being agitated very vigorously. This causes the hydrolyzed ethylene/vinyl acetate interpolymer to separate as a finely divided solid. The hydrolyzed interpolymer is then washed twice with ethyl alcohol, centrifuged in a small basket centrifuge to remove the major portion of the ethanol, thoroughly washed with water, and air dried.

*Example II*

Two hundred and ninety-six (296) parts of finely divided hydrolyzed ethylene/vinyl acetate interpolymer (molecular ratio of ethylene to vinyl acetate=10.7:1) prepared as described in Example I is mixed with 2825 parts of the urea-formaldehyde resin solution containing 1444 parts of the solid A stage resin. The resultant mixture is placed in a large steel pan and dried in a vacuum oven for 18 hours at 60° C., 1.2 hours at 60°–80° C., 1.8 hours at 80° C., and 5.5 hours at 95°–100° C. in an ordinary oven. The dried solid resinous composition thus obtained contains 17% hydrolyzed ethylene/vinyl acetate interpolymer and 83% urea-formaldehyde resin.

A portion of the resinous composition is ball milled with 0.5% beta-bromohydrocinnamic acid and 0.7% aluminum stearate. Molded articles obtained by compression molding of this composition at 155° C. and 2800 lbs./sq. in. for 8 minutes are slightly harder and more rigid than the product of Example I, and also possess good toughness and water resistance.

Another portion of the resinous composition is slurried with 2.15 times its weight of water. This mixture is spread on 1/16" birch veneer in sufficient quantity to provide 24 parts of dry resin per 1,000 square feet of finished glue line. The veneer is dried 15 minutes and subsequently bonded at 140° C. and 225 lbs./sq. in. for 10 minutes. This plywood exhibits a shear strength of 440 lbs./sq. in. with 100% wood failure when tested in accordance with Army-Navy specifications AN-NN-P-511a, which require a strength of 400 lbs./in. squared. Samples immersed in boiling water for 30 minutes show no signs of delamination. These results indicate the excellent utility of these resin compositions as plywood adhesives.

*Example III*

Sixty-four and three-tenths (64.3) parts of finely divided hydrolyzed ethylene/vinyl acetate interpolymer having a molecular ratio of ethylene to vinyl acetate of 3:1, prepared as described below, is mixed with vigorous stirring with 148 parts of an aqueous urea-formaldehyde resin sirup containing 75.5 parts of A stage resin. The resultant mixture is dried six hours at 60° C., 1½ hours at 60°-80° C., and 16 hours at 80° C. in a vacuum oven. The dried solid composition is slightly brown in color and contains 46% hydrolyzed ethylene/vinyl acetate (3:1) and 54% urea-formaldehyde resin. This composition is ball milled with 0.5% beta-bromohydrocinnamic acid and 0.7% aluminum stearate and then molded at 155° C. and 2800 lbs./sq. in. for 8 minutes. The molded articles are reddish-brown in color and possess good toughness and water resistance.

The hydrolyzed ethylene/vinyl acetate interpolymer used in the above example is prepared as follows: A pressure vessel is charged with 320 parts of vinyl acetate, 320 parts of oxygen-free water, 4 parts of the sodium salt of sulfonated white oil, and 1 part benzoyl peroxide and the pH adjusted to 3.98. Oxygen-free nitrogen is admitted over this reaction mixture to exclude all atmospheric oxygen and then ethylene admitted until the pressure in the reaction vessel is 300 atmospheres. The reaction is carried out at 70°-77° C. for 15.5 hours using constant agitation. The interpolymer is steam distilled to coagulate the resin and remove volatile impurities. The coagulated interpolymer, a slightly reddish solid, is washed and dried in a vacuum desiccator. The mol ratio of ethylene to vinyl acetate in the interpolymer is about 3:1. Two hundred and twenty-four (224) parts of dried ethylene/vinyl acetate is dissolved in 800 parts of toluene and 250 parts of ethyl alcohol. Ninety (90) grams of potassium hydroxide dissolved in 500 parts of ethyl alcohol is then added and the resultant mixture refluxed two hours. After steam distilling, washing and drying, 169 parts of hydrolyzed ethylene/vinyl acetate interpolymer is obtained.

*Example IV*

Seventy-six (76) parts of hydrolyzed ethylene/vinyl acetate (1:1.3) interpolymer, prepared as described below, is dissolved in 400 parts of ethyl alcohol. This solution and 100 parts of water are added with vigorous stirring to 174 parts of an aqueous solution of A stage urea-formaldehyde resin containing 89 parts of resin. Part of the hydrolyzed ethylene/vinyl acetate precipitates as a finely divided solid. The resultant mixture is dried in a vacuum oven for 18 hours at 60° C., 1.2 hours at 60°-80° C., and finally 5½ hours at 95°-100° C. in an ordinary oven. The dried composition is a grayish solid containing 46% hydrolyzed ethylene/vinyl acetate (1:1.3) and 54% urea-formaldehyde resin.

The above composition, after ball milling with 0.5% beta-bromohydrocinnamic acid and 0.7% aluminum stearate, is molded at 155° C. and 2800 lbs./sq. in. for 8 minutes. The molded products are tough and stand up well on outdoor exposure; they are more pliable and water sensitive than the products of Example I.

The hydrolyzed ethylene/vinyl acetate interpolymer (1:1.3) used in the above example, was prepared by a procedure similar to that described in Example III. To obtain the 1:1.3 ratio of ethylene to vinyl acetate a lower ethylene pressure (50 atms.) is used.

The hydrolyzed interpolymer should be present in substantial amount in the composition, namely, at least 10% by weight of the total weight of the hydrolyzed interpolymer and the urea-aldehyde resin. Preferably from 15% to 50% of the composition is hydrolyzed interpolymer.

In this invention only the hydrolyzed or partially hydrolyzed interpolymers are used since the unhydrolyzed interpolymers have no hydroxyl groups to permit bonding with the urea-formaldehyde resin. However, unhydrolyzed interpolymers can be employed provided a hydrolyzing catalyst, such as ammonium chloride, is present during the reaction with urea-formaldehyde resin.

Of the numerous hydrolyzed interpolymers obtained by interpolymerizing vinyl organic esters, i. e., vinyl esters of organic acids, with other polymerizable compounds containing a single ethylenic double bond and then hydrolyzing, those interpolymers are preferred which are water-sensitive but nevertheless insoluble in water. The hydrolyzed interpolymers of ethylene and vinyl organic esters in which the molar ratio of ethylene to organic ester is between 25:1 and 1:25 are particularly suitable since they possess the proper balance of hydrophylic and hydrophobic atoms to give both toughness and water resistance. With higher ratios there is a sacrifice in toughness presumably because there are fewer hydroxyl groups in the hydrolyzed interpolymer to react with the urea-fromaldehyde complex. If the ratio is below 1:25, there is a sacrifice in water resistance. A good balance of properties is obtained with interpolymers having molar ratios of ethylene to vinyl ester of 1:1 to 15:1 and within this range the preferred compositions are those in which the ratio is from 5:1 to 12:1.

The vinyl organic esters which may be used for preparing the hydrolyzed interpolymers are vinyl esters of organic acids and include aliphatic, heterocyclic, acyclic, and aromatic vinyl esters such as vinyl formate, vinyl propionate, vinyl isobutyrate, vinyl laurate, vinyl oleate, vinyl stearate, vinyl furoate, vinyl cyclohexane carboxylate, vinyl benzoate, vinyl α-naphthoate, and vinyl salicylate.

Among compounds possessing a single double bond which can be interpolymerized with the vinyl organic esters mentioned above are methyl acrylate, butyl acrylate, octyl acrylate, lauryl acrylate, isobutyl methacrylate, ethyl methacrylate, ethyl alpha-chloroacrylate, octyl alpha-bromoacrylate, lauryl alpha-iodoacrylate, dimethyl maleate, dioctyl fumarate, dipropyl fumarate, diisobutyl fumarate, methacrylamide, N-butyl methacrylamide, N-octyl methacrylamide, N-vinyl maleimide, vinyl chloride, vinyl bromide, vinylidene dichloride, trichloroethylene, isobutylene, propylene, styrene, tetrafluoroethylene, monovinyl ketone, and methyl isopropyenyl ketone.

In place of urea there can be used the various other compounds containing at least two amide groups and known to react with formaldehyde to form resins. Compounds of this kind are melamine, thiourea, ethylene urea, sym-dibutylurea, monopropyl urea, monolauryl urea, sym-trimethyl melamine, dicyandiamide, guanidine, biuret, and sym-dimethyl guanidine. The aldehydes which may be used comprise acetaldehyde, isobutyraldehyde, valeryl aldehyde, caprylaldehyde, acrolein, crotonaldehyde, tiglic aldehyde, furfural, benzaldehyde, salicylaldehyde, anisaldehyde, perilla aldehyde, and cyclohexane carbonal.

The products of this invention are readily molded under normal molding pressures at temperatures of 100° to 180° C. A preferred temperature range for molding is 120° to 160° C. The length of the molding cycle will depend upon the temperature and pressure employed.

Usually no molding catalyst is required, but conventional molding catalysts for cellulose-filled urea-formaldehyde resins are sometimes helpful. Typical useful catalysts are ammonium sulfate, benzoic acid, beta-bromohydrocinnamic acid, and zinc sulfate.

Opacifiers, pigments, dyes, antioxidants, lubricants, plasticizers, inorganic fillers, and polymeric substances, such as phenol-formaldehyde resins, sulfonamide-formaldehyde resins, nylons, acetals and ketals of polyvinyl alcohol, benzyl cellulose, ethyl cellulose, cellulose acetate, nitrocellulose, alkyd resins, polystyrene, methyl methacrylate, lignin, saw dust, and alpha-cellulose may be incorporated in these resins.

Colored articles can be molded from the products of this invention which possess remarkable brilliances, hence can be used in a number of applications wherein brilliant colors are desirable. The coloring agents can be incorporated with products at any stage but are preferably added during the blending of the hydrolyzed interpolymer and the urea-formaldehyde resin, for example on a ball mill. Examples of articles which can be molded from the colored compositions are kitchen utensils, tableware, drinking cups, baking dishes, toilet articles, bathroom fixtures, fountain pens, and mechanical pencils.

Since the products of this invention have good insulating properties and stability, they can be used in a wide variety of electrical applications. For example, they can be used in the construction of distributor heads, condensers and transformers, and electrical equipment, such as sockets, outlets, plugs, and radio parts.

The products of this invention are also useful as binding agents, textile modifying agents, adhesives, baking enamels, and insolubilizing agents.

As many apparently widely different embodiments of this invention may be made without departing from the spirit and scope thereof, it is to be understood that I do not limit myself to the specific embodiments thereof except as defined in the appended claims.

I claim:

1. A composition of matter comprising an intimate mixture of a thermosetting, soluble urea-aldehyde resin and a water-insoluble interpolymer which consists essentially of the hydrolyzed interpolymer of ethylene and a vinyl ester of a monocarboxylic acid and in which the mol ratio of ethylene to said vinyl ester is between 1:1 and 15:1, said hydrolyzed interpolymer constituting from 10% to 50% of said mixture.

2. A composition of matter comprising an intimate mixture of a thermosetting, soluble urea-formaldehyde resin and a water-insoluble interpolymer consisting essentially of the hydrolyzed interpolymer of ethylene and vinyl acetate in which the mol ratio of ethylene to vinyl acetate is between 1:1 and 15:1, said hydrolyzed interpolymer constituting from 10% to 50% of said mixture.

3. A composition of matter comprising an intimate mixture of a thermosetting, soluble urea-formaldehyde resin and a water-insoluble interpolymer consisting essentially of the hydrolyzed interpolymer of ethylene and vinyl acetate in which the mol ratio of ethylene to vinyl acetate is between 1:1 and 15:1, said interpolymer being present in amount from 15 to 50% of said mixture.

4. A molding powder comprising, in finely divided form, the composition defined in claim 2.

5. An article obtained by molding at a temperature of 100° to 180° C. the composition defined in claim 2.

6. A process for preparing molded articles from a resinous composition which comprises intimately mixing a thermosetting, soluble urea-aldehyde resin with a water-insoluble interpolymer which consists essentially of the hydrolyzed interpolymer of ethylene and a vinyl ester of monocarboxylic acid and in which the mol ratio of ethylene to said vinyl ester is between 1:1 and 15:1, said hydrolyzed interpolymer constituting from 10% to 50% of said resin and interpolymer, and then molding the mixture with application of heat at a temperature of from 100° C. to 180° C.

7. A process for preparing a resinous composition which comprises incorporating a solution of thermosetting urea-formaldehyde resin with a finely divided water-insoluble interpolymer which consists essentially of the hydrolyzed interpolymer of ethylene and a vinyl ester of monocarboxylic acid and in which the mol ratio of ethylene to said vinyl ester is between 1:1 and 15:1, said interpolymer constituting from 10% to 50% of said resin and interpolymer, and then drying the resulting mixture.

ALBERT FARIS SMITH.

REFERENCES CITED

The following references are of record in the file of this patent:

UNITED STATES PATENTS

| Number | Name | Date |
|---|---|---|
| 1,939,422 | Voss et al. | Dec. 12, 1933 |
| 2,111,006 | Robie | Mar. 15, 1938 |
| 2,169,250 | Izard | Aug. 15, 1939 |
| 2,195,254 | Miller | Mar. 26, 1940 |
| 2,200,429 | Perrin | May 14, 1940 |
| 2,268,121 | Kingsley | Dec. 30, 1941 |
| 2,277,083 | Dorough | Mar. 24, 1942 |
| 2,299,807 | Dunbar | Oct. 27, 1942 |
| 2,332,895 | D'Alelio | Oct. 26, 1943 |
| 2,332,897 | D'Alelio (2) | Oct. 26, 1943 |
| 2,332,899 | D'Alelio (3) | Oct. 26, 1943 |
| 2,386,347 | Roland | Oct. 9, 1945 |

FOREIGN PATENTS

| Number | Country | Date |
|---|---|---|
| 361,910 | Great Britain | Nov. 16, 1931 |
| 484,476 | Great Britain | May 2, 1938 |
| 542,286 | Germany | Jan. 22, 1932 |

OTHER REFERENCES

Ser. No. 233,292, Schubert (A. P. C.) pub. May 4, 1943.